United States Patent
Funayama

(10) Patent No.: US 7,804,512 B2
(45) Date of Patent: Sep. 28, 2010

(54) METHOD AND APPARATUS FOR PRODUCING AN IMAGE

(75) Inventor: Yukinori Funayama, Shizuoka (JP)

(73) Assignee: Naltec Inc. (JP)

( * ) Notice: Subject to any disclaimer, the term of this patent is extended or adjusted under 35 U.S.C. 154(b) by 106 days.

(21) Appl. No.: 11/921,222

(22) PCT Filed: May 29, 2006

(86) PCT No.: PCT/JP2006/310676

§ 371 (c)(1),
(2), (4) Date: Aug. 8, 2008

(87) PCT Pub. No.: WO2006/129606

PCT Pub. Date: Dec. 7, 2006

(65) Prior Publication Data

US 2009/0135242 A1    May 28, 2009

(30) Foreign Application Priority Data

May 31, 2005    (JP) .............................. 2005-158252

(51) Int. Cl.
    *B41J 2/435*    (2006.01)
    *B41J 2/47*     (2006.01)
(52) U.S. Cl. ...................................... 347/235; 347/250
(58) Field of Classification Search ................. 347/229, 347/234, 235, 248–250, 116
See application file for complete search history.

(56) References Cited

U.S. PATENT DOCUMENTS

| 4,717,925 | A | * | 1/1988 | Shibata et al. | 347/250 |
| 5,115,328 | A | * | 5/1992 | Kadono | 358/474 |
| 5,117,243 | A | * | 5/1992 | Swanberg et al. | 347/254 |

FOREIGN PATENT DOCUMENTS

| JP | 07-181408 A | 7/1995 |
| JP | 09-174917 | 7/1997 |
| JP | 10-096869 A | 4/1998 |
| JP | 2005-096351 A | 4/2005 |

OTHER PUBLICATIONS

International Preliminary Examination Report (English translation), mailed Dec. 21, 2007.

* cited by examiner

*Primary Examiner*—Hai C Pham
(74) *Attorney, Agent, or Firm*—Blank Rome LLP

(57) ABSTRACT

A method of producing an image that can eliminate an fθ lens is provided. This method of producing an image includes producing the image from a plurality of dots with varying intervals that are to be formed by linearly scanning an image forming surface with light that has been modulated using image data for producing by a polygon mirror that rotates at a constant angular velocity, and generating, before the producing the image, the image data for producing to form the image with the plurality of dots with varying intervals from original image data that forms a target output image with a plurality of dots with constant intervals. The step of generating the image data for producing includes setting a state of a first dot included in the plurality of dots with varying intervals at a state of a second dot that is included in the plurality of dots with constant intervals obtained from the original data and is at a position that is close to a position of the first dot.

16 Claims, 5 Drawing Sheets

METHOD AND APPARATUS FOR PRODUCING AN IMAGE

TECHNICAL FIELD

The present invention relates to a method and apparatus suited to producing or making an image on an image forming surface, such as the circumferential surface of a photoreceptor drum, without using an fθ lens system.

BACKGROUND ART

In a laser printer or a copier, an image (latent image) is made or produced by reflecting light that has been modulated using image data by a polygon mirror so as to scan a photoreceptor drum. The latent image is then developed using toner and the developed image is transferred to a print sheet. By doing so, a desired image can be printed.

Japanese Laid-Open Patent Publication No. H09-174917 discloses a technology where light that has been reflected by a polygon mirror moves at a constant speed in a main scanning direction via an fθ lens. The publication discloses that when doing so, errors relating to maintaining a constant speed caused by errors in the surface precision of the polygon mirror, errors relating to constant speed for the fθ lens, alignment errors for an optical unit, and the like are corrected by a combination of a short-period clock and a long-period clock using constant-speed correction data. This technology is aimed at preventing displacements in print positions from occurring due to errors in maintaining a constant speed.

DISCLOSURE OF THE INVENTION

In a laser printer, the surface (i.e., image forming surface) of a photoreceptor body on which an image is to be made is scanned with laser light in a main scanning direction at a constant velocity using an fθ lens to form a latent image on the photoreceptor body. By eliminating the fθ lens, it is possible to simplify the construction of the optical system of a laser printer. This means that eliminating the fθ lens is important in providing a compact, low-cost printer.

Maintaining a constant velocity in the main scanning direction is a function required in order to form dots with constant intervals (equal intervals). One technology for eliminating an fθ lens provides a means for forming dots with constant intervals in place of the fθ lens. For example, to form dots with constant intervals, it would be conceivable to control the on/off timing of a laser light source and/or to change the rotational velocity of the polygon mirror. If the on/off timing of the laser light source is controlled over the entire range in the main scanning direction, special-purpose hardware for continuously changing the period of the pixel clock becomes necessary. The polygon mirror rotates at several tens of thousand revolutions per minute, a speed at which one line is scanned in several ms. Accordingly, it is difficult to precisely control the rotational velocity of a polygon mirror rotating at such high speed. There is the possibility that the hardware cost will actually increase and the apparatus size will become larger when the fθ lens is eliminated.

One aspect of the present invention is a method of producing or making an image, including steps of: producing the image from a plurality of dots with varying intervals in distance that are formed by linearly scanning an image forming surface with modulated light by a polygon mirror that rotates at a constant angular velocity, the modulated light having been modulated by image data for producing; and generating, before the step of producing the image, the image data for producing to form the image with the plurality of dots with varying intervals from original image data that forms an original image to be outputted with a plurality of dots with constant intervals (equal intervals) in distance.

The present invention provides a method that can make an image from an image with dots with constant intervals using dots with non-constant intervals. The present invention has a premise that the intervals of distance between a plurality of dots for plotting change when an image is produced. For this reason, before an image is produced, image data for producing is generated using dots with varying intervals. Accordingly, it is possible to omit the providing of dots with constant intervals to produce an image. That is, it is possible to omit a mechanism for moving a beam at a constant velocity using an fθ lens and to omit a mechanism for controlling the on/off timing of the laser light source and for changing the rotational velocity of the polygon mirror. This means that an image can be produced by emitting laser light, which has been modulated using the image data for producing, onto an image forming surface using a polygon mirror that rotates at a constant velocity without using an fθ lens so as to linearly scan the surface where the image is formed.

Another aspect of the present invention is a method of producing an image using a plurality of dots with non-constant intervals in distance, including a step of generating image data for producing to form the image with the plurality of dots with non-constant intervals by calculating a state for plotting by each dot of the plurality of dots with non-constant intervals from original image data that forms an original or target image to be outputted using a plurality of dots with constant intervals in distance.

Yet another aspect of the present invention is an image producing apparatus including: means for producing the image with a plurality of dots with varying intervals in distance by modulating the plurality of dots with varying intervals using image data for producing; and means for generating the image data for producing to form the image with the plurality of dots with varying intervals by obtaining a state to be plotted by each dot of the dots with varying intervals from original image data that forms an original image to be outputted using dots with constant intervals. This image forming apparatus receives conventional image data for making an original image with dots with constant intervals as original image data and converts the original image data to image data for producing using the means for generating the image data, and therefore can produce an image composed of dots with varying intervals.

One favorable aspect of the means for producing the image includes means for producing an image from the plurality of dots with varying intervals by linearly scanning an image forming surface with light modulated using the image data for producing by a polygon mirror that rotates at a constant angular velocity. The means for producing an image includes a galvanometer mirror or the like and may include other optical systems that linearly scan the image forming surface with light.

One favorable aspect of the means for producing an image includes an optical system for exposing, on a surface for forming an image on a photoreceptor, a latent image from or composed of the plurality of dots with varying intervals that have been modulated using the image data for producing. Another favorable aspect of the present invention is a print apparatus including: the image producing apparatus described above; a photoreceptor with a surface on which an image to be printed is formed; a developing unit for developing a latent image formed on the photoreceptor using toner; and a transfer unit for transferring the developed image onto a print sheet. This print apparatus has a compact, low-cost construction that omits a function for forming dots with constant intervals, such as an fθ lens. In addition, this print apparatus is supplied with conventional image data (original image data) that form an image with dots with constant intervals and can make an image (latent image) corresponding to the original image on the photoreceptor with dots with varying intervals and print the image to be outputted.

One method that is suited to generate the image data for producing by obtaining the state for plotting by a plurality of dots with varying intervals, that is, a plurality of dots with non-constant intervals is generating the image data for producing so that a state for plotting by each dot of dots with varying intervals positioned near dot or dots of the dots with constant intervals sets the state of such dot or dots of the dots with constant intervals. That is, the step of generating the image data for producing in the method of the present invention should preferably include setting a state of a first dot included in the plurality of dots with varying intervals at a state of a second dot that is included in the plurality of dots with constant intervals obtained from the original image data and is at a position that is close to a position of the first dot. Also, the means for generating the image data of the image producing apparatus should preferably include setting a state of a first dot included in the plurality of dots with varying intervals at a state of a second dot that is included in the plurality of dots with constant intervals obtained from the original image data and is at a position that is close to a position of the first dot.

One method of setting the state of a first dot with varying intervals at a state (value) of a second dot with constant intervals at a position close to the position of the first dot includes the following steps.

1. Setting a state of a first dot included in the plurality of dots with varying intervals at a state of a second dot that is included in the plurality of dots with constant intervals obtained from the original image data and has the same place in an order as the first dot.

2. Setting, based on a difference between the position of the first dot and the position of the second dot, a state of the first dot at a state of a third dot included in the plurality of dots with constant intervals when the position of the first dot is close to the third dot.

According to this method, data for producing including a plurality of dots with varying intervals in distance and an equal number of dots to the plurality of dots with constant intervals is generated, and an image provided as the original image given by the original image data can be produced using such data for producing.

Another method of setting the state of a first dot with varying intervals at a state (value) of a second dot at the corresponding position of the first dot includes setting a state of a first dot included in the plurality of dots with varying intervals at a state of a second dot that is included in the plurality of dots with constant intervals obtained from the original image data when a position of the first dot is closest to the position of the second dot. A dot out of the dots with varying intervals positioned closest to a dot with constant intervals is a dot that is suited to representing such dot with constant intervals in the plurality of dots with varying intervals. Accordingly, the image data for producing is generated so that the state of the representative dot is set as the state (value) of the dot with constant intervals. A matrix of the dots with varying intervals has a variable density. Accordingly, if the dots with constant intervals are reproduced by all of the dots with varying intervals, there will be cases where the difference in dot density affects the image quality. For example, for an image where tones are reproduced using dots, it is preferable to minimize the variation in dot density.

Another aspect of the present invention is a host apparatus including a functional unit of generating image data for producing. The image data for producing is to be transferred to an image producing apparatus that includes means for producing an image from a plurality of dots with varying intervals in distance by modulating the plurality of dots using the image data for producing. The functional unit for generating image data for producing in the host apparatus includes generating the image data for producing to form an image with the plurality of dots with varying intervals from original image data that forms a target image to be outputted by the image forming apparatus with a plurality of dots with equal intervals in distance by setting a state of a first dot included in the plurality of dots with varying intervals at a state of a second dot that is included in the plurality of dots with constant intervals obtained from the original image data and is at a position that is close to a position of the first dot.

Yet another aspect of the present invention is a program for causing a computer to generate image data for producing. The image data for producing is to be transferred to an image producing apparatus that includes means for producing an image from or composed of a plurality of dots with varying intervals in distance by modulating the plurality of dots using the image data for producing. This program or program product can be supplied having been recorded on a suitable recording medium such as a CD-ROM as a driver program for controlling an image producing apparatus such as a printer. The program or program product includes generating the image data for producing to form an image with the plurality of dots with varying intervals from original image data that forms a target image to be outputted by the image forming apparatus with a plurality of dots with constant intervals in distance, and sets a state of a first dot included in the plurality of dots with varying intervals at a state of a second dot that is included in the plurality of dots with constant intervals obtained from the original image data and is at a position that is close to a position of the first dot.

DETAILED DESCRIPTION

Figure 1:
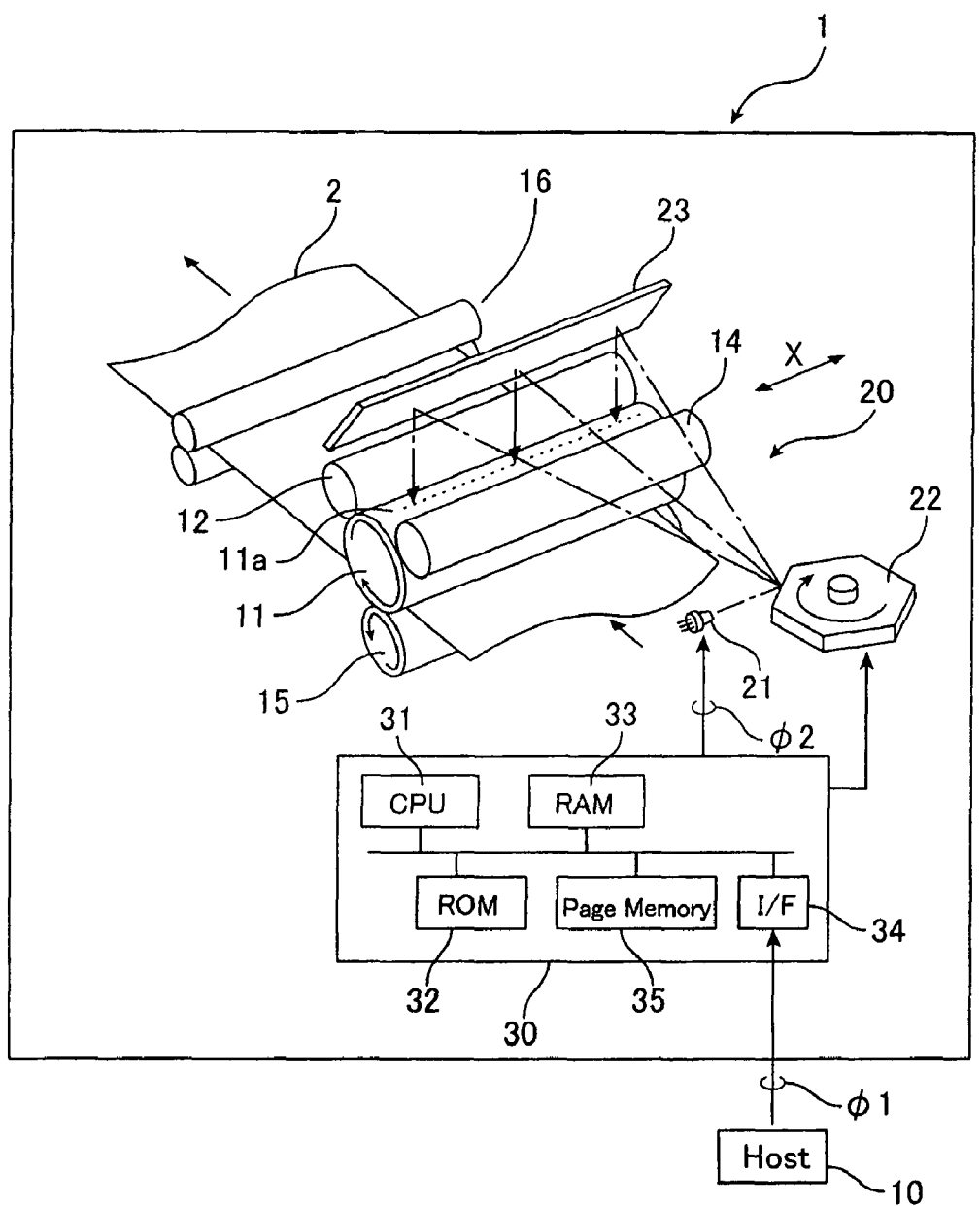
FIG. 1 is a block diagram of a printer according to an embodiment of the present invention.

FIG. 1 is a block diagram of a print apparatus (printer) according to an embodiment of the present invention. This printer 1 includes a photoreceptor drum 11, an outer circumferential surface 11a of which is an image forming surface, an image producing unit 20 for producing or making an image (latent image) on the photoreceptor drum 11, and a control unit 30 for controlling the printer 1. The image producing unit 20 produces an image from (composed of) dots with non-constant intervals on the photoreceptor drum 11 without using an fθ lens. The control unit 30 has a functional unit that generates image data $\phi 2$ for producing and supplies the image data φ2 to the image producing unit 20. The printer 1 also includes a charging roller 12 that charges the photoreceptor drum 11, a developing unit 14 that develops an actual image by causing toner to adhere to the photoreceptor drum 11 on which the latent image has been made, a transfer roller 15 that transfers the actual image formed on the photoreceptor drum 11 onto a print sheet 2, and a fixing roller 16 that fixes the actual image transferred onto the print sheet 2. The printer 1 has the common functions to an apparatus called a "laser printer" relating in that the photoreceptor drum 11 is charged, the latent image is then exposed, toner is applied to form an actual image (visible image), and the actual image is transferred to a print sheet 2.

The image producing unit 20 includes an optical system for exposing the charged photoreceptor drum 11 using laser light to producing a latent image (or simply "image"). The optical system includes a laser oscillator 21 that outputs light modulated using the image data φ2 for producing, a polygon mirror 22 that rotates at a constant angular velocity and reflects the laser light outputted from the laser oscillator 21, and a reflective plate 23 that directs the laser light reflected by the polygon mirror 22 toward the photoreceptor drum 11.

The image producing unit 20 is controlled in synchronization with a clock of a constant frequency. That is, the laser oscillator 21 is driven by drive pulses of a predetermined frequency and outputs constant frequency pulsed laser light that has been modulated using the image data φ2 for producing. The pulsed laser light is incident on the outer circumferential surface 11a of the photoreceptor drum 11 without passing through an fθ lens. Accordingly, the speed at which the laser light scans or sweeps the outer circumferential surface 11a of the photoreceptor drum 11 changes according to the angle of the polygon mirror 22, and the intervals of distance between the plurality of dots formed on the outer circumferential surface 11a by the pulsed laser light changes according to the angle of the polygon mirror 22.

Note that although not shown in FIG. 1, the image producing unit 20 may include other optical elements or optical members including lenses and prisms to focus the laser light or adjust the incident direction.

The control unit 30 has a function for generating the image data φ2 for plotting and a function for controlling various other processes in the print apparatus 1. The control unit 30 includes a CPU 31, a ROM 32, a RAM 33, an interface 34 that obtains print data from a host device 10, and a page memory 35 with a capacity that can record at least one page of print data. In the control unit 30, various functions are realized by having various programs stored in advance in the ROM 32 executed by the CPU 31.

Figure 2:
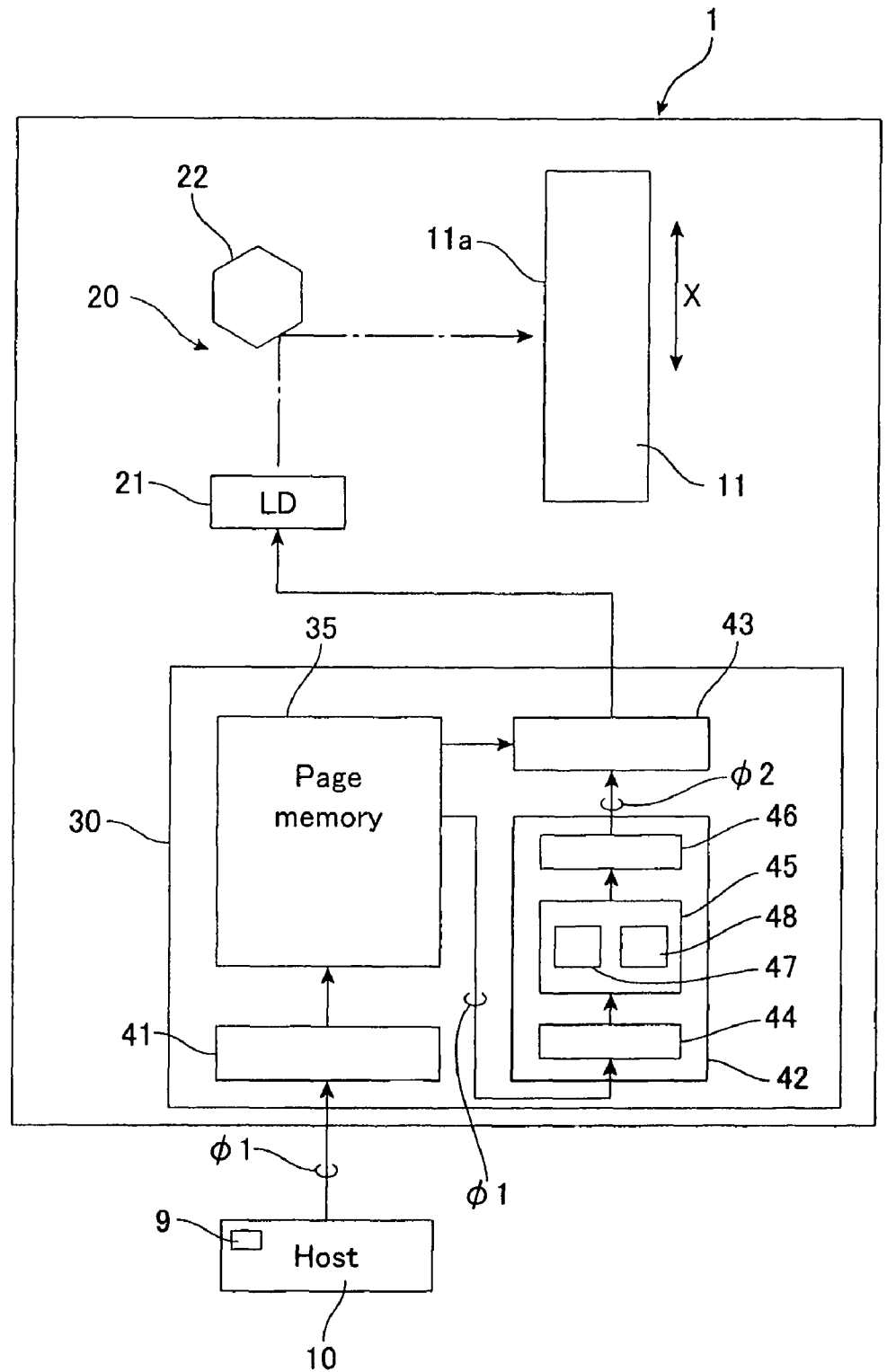
FIG. 2 is a block diagram of functions of the printer shown in FIG. 1.

FIG. 2 is a block diagram showing the functional units of the control unit 30. The control unit 30 includes an interface functional unit 41, an image data converting functional unit 42, and a print control functional unit 43. The interface functional unit 41 receives original image data φ1 from the host device 10, for example a personal computer, and stores the original image data φ1 in the page memory 35. The image data converting functional unit 42 converts the original image data φ1 from the page memory 35 line by line (in line units) to the image data φ2 for producing. The print control functional unit 43 modulates the laser light outputted from the laser oscillator 21 included in the image producing unit 20 using the image data φ2 for producing the image. In addition, the print control functional unit 43 prints using the photoreceptor drum 11 included in the image producing unit 20, the developing unit 14, the transfer roller 15, and other print mechanisms.

The image producing unit 20 according to the present embodiment forms an image by linearly scanning the photoreceptor drum 11 in a main scanning direction X with laser light that has been reflected by the polygon mirror 22 without the light passing through an fθ lens. Accordingly, the intervals of distance between the plurality of dots formed on the image forming surface 11a of the photoreceptor drum 11 are not constant. That is, the intervals of distance between dots out of the plurality of dots formed on the forming surface 11a vary, and the distance between dots in the center in the main scanning direction X are narrower than the distance between dots at both ends in the main scanning direction X. The original image data φ1 received from the host device 10 is data that forms an original image (target image) to be outputted using a plurality of dots with constant intervals in distance. The image data converting functional unit 42 generates, from the original image data φ1 that form an image to be outputted (i.e., original image) with a plurality of dots with constant intervals the image data φ2 that form an image (output image) corresponding to the original image with a plurality of dots with varying intervals.

Figure 3:
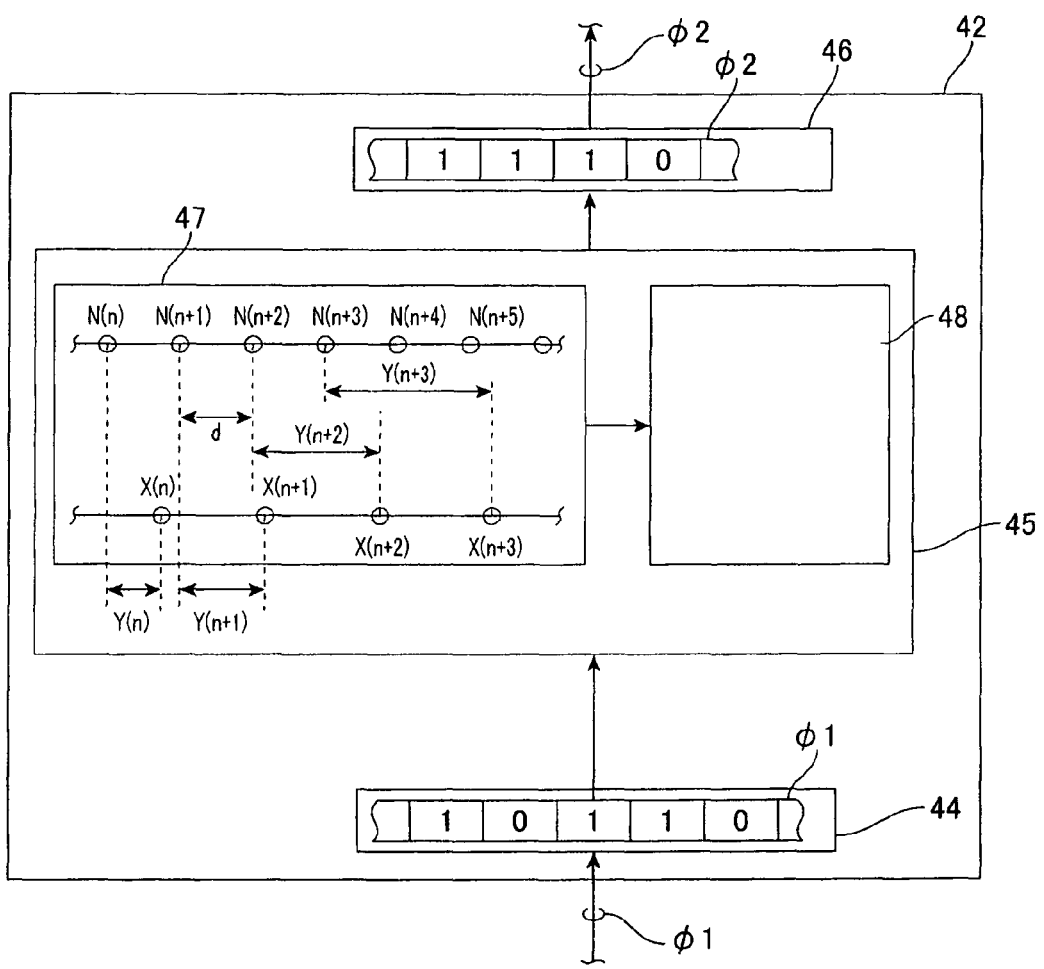
FIG. 3 is a diagram showing an image data converting function.

FIG. 3 is a block diagram of the image data converting functional unit 42 showing more detail. The image data converting functional unit 42 includes an input buffer 44 for storing the original image data φ1, a generating functional unit 45 for generating the image data φ2 for producing (i.e., image producing data or imaging data) from the original image data φ1, and an output buffer 46 for storing the generated image producing data φ2. The input buffer 44 stores information on a plurality of dots with constant intervals included in the original image data φ1 that form an original image in units of lines in the main scanning direction X. The generating functional unit 45 calculates or obtains a state to be plotted by each dot of a plurality of dots with varying intervals, that is, a plurality of dots with non-constant intervals, from information on the plurality of dots with constant intervals included in the original image data φ1 line by line to generate the image producing data φ2 that includes data of the plurality of dots with non-constant intervals. The generated image producing data φ2 is outputted in line units (line by line) from the output buffer 46.

The generating functional unit 45 sets the state (normally expressed as "on" or "off", or "1" or "0") of a dot $X(n1)$ that is the $n1^{th}$ dot with a varying interval in distance (hereinafter such dots are referred to as "plot dots") at the state of a dot $N(n2)$ out of the dots with constant intervals in distance (hereinafter such dots are referred to as "original dots") at a position that is close to the position (i.e., position on a main scanning line) of the plot dot $X(n1)$. Here, n1 and n2 are arbitrary integers. In this example, for the $n1^{th}$ plot dot $X(n1)$, the state of the plot dot $X(n1)$ is set by assuming that the $n1^{th}$ original dot $N(n1)$ has moved to the position of the plot dot $X(n1)$ and then the state of the original dot $N(n2)$ that is closest to the plot dot $X(n1)$ is checked. In this method, the state of the plot dot $X(n1)$ with non-constant intervals is set from the original data φ1 based on the position of the original dot $N(n1)$.

To do so, the generating functional unit 45 includes a displacement calculating unit 47 that calculates a displacement $Y(n)$ of an original dot $N(n)$ (where n is an arbitrary integer) on the assumption that the original dot $N(n)$ has been shifted to the plot dot $X(n)$. The displacement $Y(n)$ is the difference between the position, on a main scanning line, of the plot dot $X(n)$ and the position of the original dot $N(n)$. The generating functional unit 45 also includes a determining unit 48 that judges whether the displacement $Y(n)$ exceeds the interval of distance d between the original dots and finally determines the value (i.e., state) of the plot dot X(n). When the displacement Y(n) exceeds the interval d, the determining unit 48 changes the state of the plot dot X(n) to an original dot N(n+i) (where i is an arbitrary integer) that is shifted by the displacement Y(n) from the original dot N(n). On the other hand, when the displacement Y(n) is equal to or below the dot interval d, the state of the plot dot X(n) is not changed.

Figure 4:
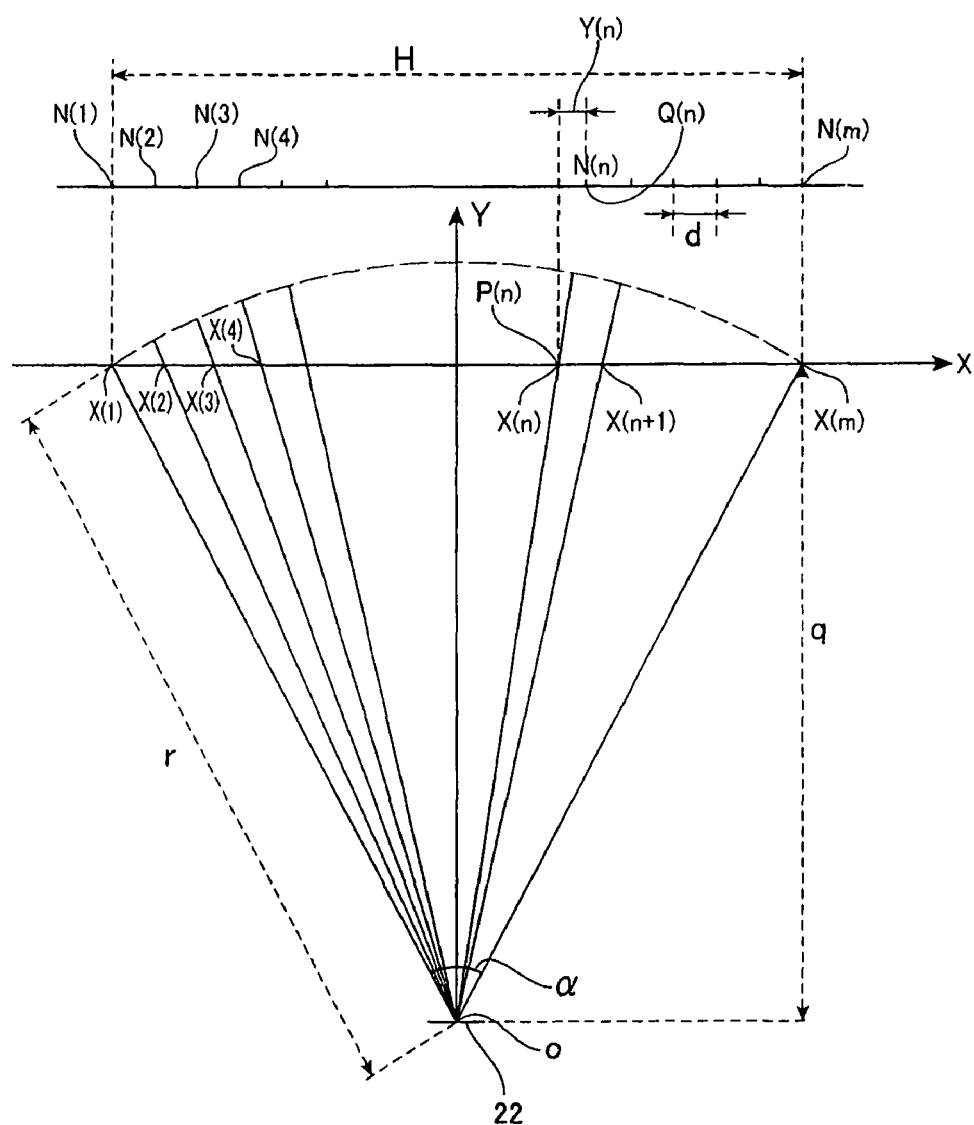
FIG. 4 is a diagram for explaining a process that generates data for producing from original image data.

FIG. 4 schematically shows a state where a plurality of plot dots X(i) are formed on the image forming surface 11a of the photoreceptor drum 11 by the image producing unit 20. The image forming surface 11a is disposed at a position having a distance q from a reflection point O of laser light on the polygon mirror 22. The laser light outputted from the image producing unit 20 produces an image by scanning the image forming surface 11a in the main scanning direction X in units of the length H. The polygon mirror 22 moves by a scanning angle range α corresponding to the scanning length H at a constant angular velocity to form total m plot dots X(i) in the range of the scanning angle α. If a main scanning line is set as the X axis, the position P(n) on the main scanning line of the $n^{th}$ plot dot X(n) can be expressed by Equations (1) to (3) below. Here, the origin on the X axis on a main scanning line is set at a position where a normal (Y axis) extends from the reflection point O, and the length from the reflection point O to both ends of the scanned length H is set as "r".

$$P(n) = q \tan(n\Delta\theta - \alpha/2) \quad (1)$$

$$\alpha = \cos^{-1}\{(2r^2 - H^2)/2r^2\} \text{ (from the cosine theorem)} \quad (2)$$

$$\Delta\theta = \alpha/m \quad (3)$$

The position Q(n) of an $n^{th}$ original dot N(n) for the case where total m original dots N(i) are disposed at equal (constant) intervals along the scanned length H can be expressed by Equation (4) below.

$$Q(n) = nH/m - H/2 \quad (4)$$

Accordingly, the position Q(n) on a main scanning line of the original dot N(n) and the position P(n) on a main scanning line of the plot dot X(n) can be calculated in advance if physical parameters that are unique to the image producing unit 20, such as the distance q, the scanned length H, the scanned angle range α, and the resolution (i.e., the number of plot dots) has been determined. Once the printer 1 to output the image is decided, the configuration or arrangement of the printer 1 will also be decided. Accordingly, the physical parameters mentioned above that are unique to the printer 1 will also be decided. This means that the respective positions of the original dots N when the total m original dots N(1) to N(m) are disposed with constant intervals on a main scanning line on the image forming surface 11a of the photoreceptor drum 11 in the printer 1 and also the positions of the plot dots X can be calculated in advance. Here, m is an integer of 2 or higher and in the following description, a group of a plurality of original dots is referred to as the "original dots N" and a group of a plurality of plot dots is referred to as the "plot dots X".

In the functional unit 42 that converts the image data, the state of a first dot X(n) included in the plurality of dots (plot dots) X with varying intervals is set at the state of a second dot N(i) that is included in the plurality of dots (original dots) N with constant intervals obtained from the original image data φ1 and is located at a position close to the first dot X(n). By doing so, states whereby the plot dots X produce an image (output image) on the outer circumferential surface 11a corresponding to the original image formed by the original dots N is calculated in advance to generate the plot dots X.

This image data converting functional unit 42 generates the image producing data φ2 that is composed of the same number of plot dots X as the number of the original dots N. When the displacement Y(n) of the position P(n) on a scanning line of the $n^{th}$ plot dot X(n) from the position Q(n) on a scanning line of the $n^{th}$ original dot N(n) exceeds the inter-dot distance d (i.e., the interval between dots) for the original dots, the image data converting function 42 updates the value (state) of the plot dot X(n) to the value (state) of an original dot N(i) to be reproduced near or at the position P(n). Accordingly, the image producing data φ2 can be generated without increasing the number of dots.

The generation of the image producing data φ2 by the generating functional unit 45 assuming that the original dots N with constant intervals are shifted to the plot dots X with varying intervals and then setting the value of a plot dot X with the displacement Y exceeding the boundary d between the original dots N at the value of an original dot N located at the shifted position, will now be described in more detail. For example, in FIG. 3, the displacement Y(n) of the $n^{th}$ plot dot X(n) obtained by the displacement calculating unit 47 is smaller than the inter-dot distance d. Accordingly, the determining unit 48 sets the value of the plot dot X(n) at the value of the original dot N(n). The displacement Y(n+1) of the n+1$^{th}$ plot dot X(n+1) obtained by the displacement calculating unit 47 exceeds the inter-dot distance d. Accordingly, the determining unit 48 sets the value of the original dot N(n+2), not the value of the original dot N(n+1), as the value of the plot dot X(n+1). When the displacement Y(n) exceeds the inter-dot distance d and if the displacement Y(n) is divided by the inter-dot distance d and gets the quotient a, the value of an original dot N(n+a) that is a number of dots a after (or before when the displacement is negative) the original dot N(n) can be set as the value of the plot dot X(n).

Figure 5:
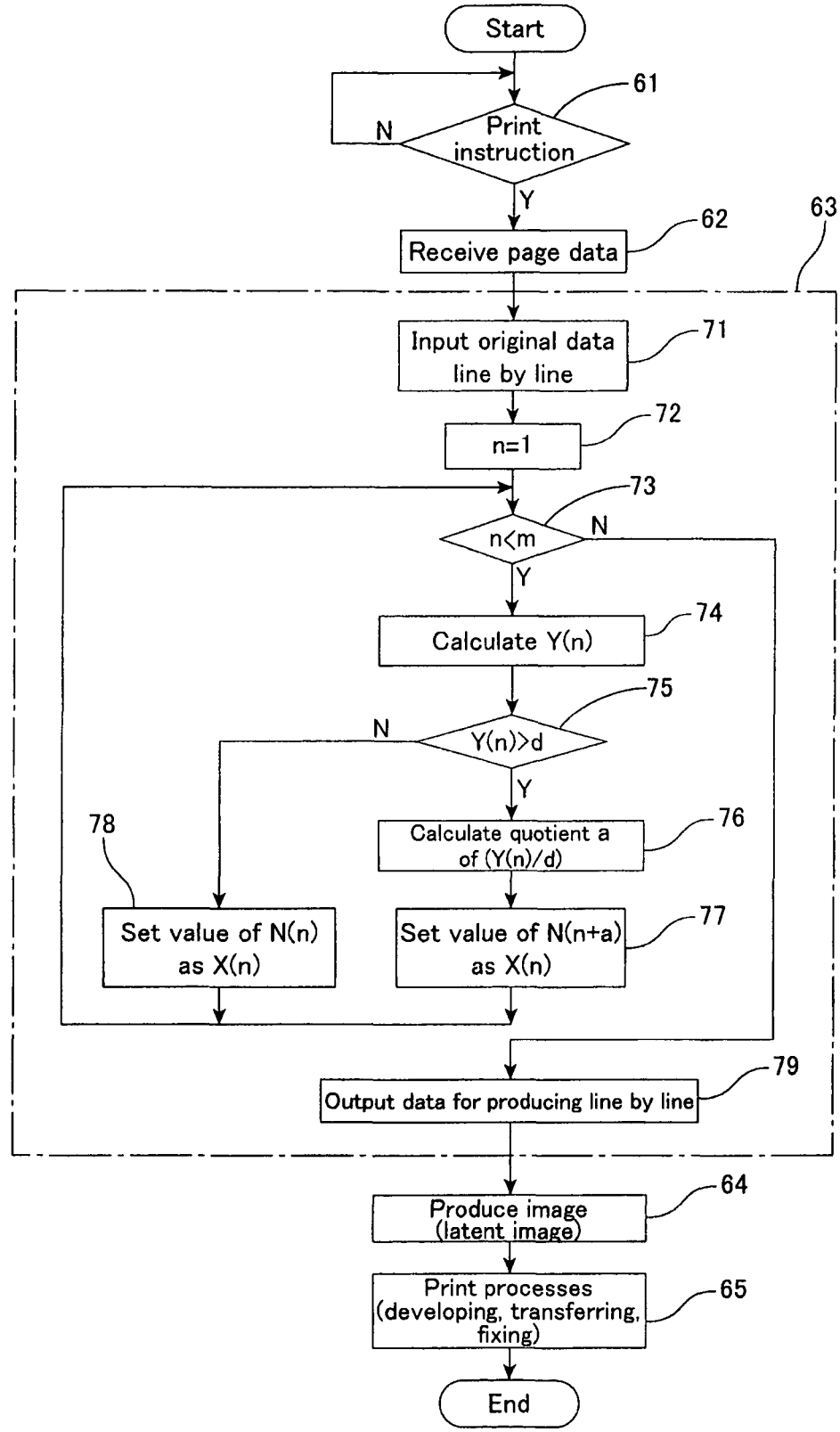
FIG. 5 is a flowchart showing a process carried out by the printer shown in FIG. 1.

FIG. 5 shows a print process executed by the printer 1 by way of a flowchart. When there is a print instruction from the host 10 in step 61, in step 62 the original image data φ1 page by page (in page units) is obtained from the host 10 and stored in the page memory 35. Next, in step 63, the image data converting functional unit 42 converts the original image data φ1 line by line to the image producing data φ2 (a process that generates the image data for producing). In step 64, an image (latent image) is formed on the image forming surface 11a of the photoreceptor drum 11 by the image producing unit 20 using the image producing data φ2. After this, in step 65, the latent image on the photoreceptor drum 11 is developed and transferred to a print sheet to print and output the image.

In step 63 that generates the image producing data, the generating functional unit 45 converts, line by line, the original dots N(1) to N(m) of the original image data φ1 to the plot dots X(1) to X(m) and calculates the displacements Y(1) to Y(m) for generating the image producing data φ2. More specifically, in step 71, one line of original image data φ1 is obtained. In steps 72 and 73, one line of the original dots N is searched. In step 74, the displacement Y(n) between the original dot N(n) and the plot dot X(n) is calculated. In step 75, it is judged whether the displacement Y(n) of each original dot N(n) exceeds the dot interval, or "inter-dot distance" d. When the displacement Y(n) exceeds the dot interval d; in step 76, the quotient a produced when the displacement Y(n) is divided by the dot interval d is calculated and in step 77, the value of a shifted original dot N(n+a) is set as the plot dot X(n). On the other hand, when the displacement Y(n) does not exceed the dot interval d, in step 78, the value of the corresponding original dot N(n) is set as the plot dot X(n). When one line of plot data φ2 has been generated, in step 79 the image producing data φ2 is outputted.

In the printer 1, data of each dot of the plot dots X whose intervals are not constant is generated and the latent image is formed on the surface 11a of the photoreceptor drum 11 using the data φ2 for producing including such plot dots X. Accordingly, it is not necessary to form dots N with constant intervals on the surface of the photoreceptor drum 11 and therefore an fθ lens for scanning the surface 11a of the photoreceptor drum 11 at a constant velocity becomes unnecessary. In place of the fθ lens, it is also unnecessary to dynamically change the driving frequency of the laser light source or the angular velocity of the polygon mirror. Using the dots X with varying intervals, the similar image as the intended or targeted original image formed with the dots N with constant intervals can be produced without warping. Accordingly, in the printer 1 of the present embodiment of the invention, the fθ lens is omitted and it is also unnecessary to use a mechanical mechanism or complex circuit for modulating the frequency in place of the fθ lens. This means that the desired image can be printed out by the printer 1 with a simple construction.

When the number of dots N with constant intervals that compose one line and the number of dots X with varying intervals are approximately equal, the dots with the varying intervals may not correspond to all of the dots with constant intervals, and some dots out of the dots with the constant intervals may not be reproduced by the dots with the varying intervals. However, the number of dots N with constant intervals that may not be reproduced by the plurality of dots X with the varying intervals is suppressed to a few percent or so of the total number of dots. In recent years, the resolution of printer has become extremely high, so that there may be almost no drop in image quality even if a few percent of the dots are dropped. By increasing the number of dots with varying intervals used for producing image relative to the number of dots with constant intervals in the original image data, it is possible to suppress the omission of dots.

With the method described above, the image producing data φ2 is generated by setting the state of a plot dot X(j) (where j is an arbitrary integer) in the vicinity of an original dot N(i) at the state of the original dot N(i). Accordingly, when there is no plot dot X(j) in the vicinity of an original dot N(i), the data of such original dot N(i) may not be reflected by any of the plot dots X. In the example shown in FIG. 3, the value of the original dot N(n+1) is not reflected by any of the plot dots X. When an A4-sized image is printed at 600 dpi, the number of dots formed on one scanning line in the shorter dimension (which is approximately 200 mm long) is 4,800. According to the physical parameters of the printer, the expected number of original dots that will be dropped is around 178. Accordingly, the number of dots that are not reflected by the plot dots X is around 4% of the original dots, which does not cause significant deterioration in image quality.

When an image is made of plot dots X where the interval between dots varies, if the same number of dots as the original dots N (that have a resolution of 600 dpi) are generated as the plot dots X, in the plot dots X, the interval between dots in the center in the main scanning direction X falls to around 75% of the interval between dots at both ends in the main scanning direction X. That is, the resolution in the center is higher than the resolution at the periphery, so that the resolution in the center is equivalent to 670 dpi and the resolution in the periphery is equivalent to 500 dpi. Accordingly, in an image where tones are reproduced according to dot density, there is the risk that the center will tend to be dark and the periphery will tend to be light.

To prevent the dropping of dots described above, it would be conceivable to increase the resolution of the plot dots X to increase the number of plot dots X. In such case though, still the center will tend to be dark and the periphery will tend to be light in an image where tones are reproduced according to dot density. To maintain the tone reproduction of the original dots N where the tones are expressed by dots itself, when a plurality of plot dots correspond to one original dot, it is preferable to set the state of only one representative plot dot at the state of the one original dot. That is, when a process that generates image data for producing is carried out by the image data converting function 42, if the position of a first dot X(n) is closest to the position of a second dot N(i) included in a plurality of dots (original dots) N with constant intervals obtained from the original image data, the state of the first dot X(n) included in a plurality of dots (plot dots) X with varying intervals is set at a state of the second dot N(i). When there are a plurality of plot dots near or around the position of the second dot N(i), for example, when the plot dots X(n) and X(n+1) are present, only the plot dot X(n) that is closest to the original dot N(i) is set at the state of the original dot N(i) and the other plot dot X(n+1) is set in an initial state (normally off or "0").

Note that the method of converting the original dots N to the plot dots X is not limited to the method described above. Instead of converting line by line in the scanning direction, it is possible to convert the data in units of a plurality of lines or in page units. The method of setting the dot interval d as a threshold may also be a mid of displacement (intermediate point) between dots or the like. In addition, it is possible to add a process that can adds extra plot dots to a plot dot X with a large displacement Y in order to reflect the state of an original dot N.

In the example described above, the image producing data φ2 is generated by the printer 1 that is an image forming apparatus according to the present embodiment. On the other hand, the process that generates the image data shown in FIG. 5 (step 63) may be executed by the host device 10. For example, as shown in FIG. 2, by adding the image data converting functional unit 42 to a driver program 9 that is installed in a personal computer 10 as the host device, it is possible to have the personal computer 10 execute a process that generates the image producing data. By transmitting the image producing data φ2 generated by the host device 10 to the printer 1, it is possible to have an image printed by a printer that does not have an fθ lens. Such printer that does not have an fθ lens can also form images with no warping in spite of having no complex hardware and software in the printer itself. This printer driver program 9 includes instructions for having a computer carry out the process for generating image data shown in FIG. 5. This program or program product can be provided having been recorded on a suitable recording medium such as a CD-ROM, or can be provided via a computer network such as the Internet.

Although the printer 1 has been described as an example in the embodiment described above, other print apparatuses that produce an image using light modulated according to image producing data, such as a multifunction device in which functions such as copying and scanning are also integrated, are also included in the present invention. The present invention also includes a device that is equipped with a plurality of laser oscillators and/or polygon mirrors. In addition, the present invention can be applied to all devices that scan a surface to form an image by using a polygon mirror to reflect light that has been modulated according to image data. The present invention is also not limited to devices that use polygon mirrors, and also includes image forming apparatuses that include other optical systems for forming an image by scanning light, such as a galvanometer mirror. Accordingly, the present invention is not limited to a device that uses the circumferential surface of a photoreceptor drum as an image forming surface and includes an image forming apparatus, such as a projector, that uses a flat surface, such as a screen, as the image forming surface.

The invention claimed is:

1. A method of producing an image comprising:

producing the image from a plurality of dots with varying intervals in distance that are formed by linearly scanning an image forming surface with modulated light by a polygon mirror that rotates at a constant angular velocity, the modulated light having been modulated by image data for producing; and generating, before producing the image, the image data for producing to form the image with the plurality of dots with varying intervals from original image data that form an original image to be outputted with a plurality of dots with constant intervals in distance, wherein generating the image data for producing includes setting a state of a first dot included in the plurality of dots with varying intervals at a state of a second dot that is included in the plurality of dots with constant intervals obtained from the original image data and is at a position that is close to a position of the first dot.

2. The method according to claim 1, wherein setting a state of the first dot includes:

setting a state of the first dot at a state of the second dot and having a place in an order same as the first dot, and setting, when a position of the first dot is close to a third dot included in the plurality of dots with constant intervals, the state of the first dot at a state of the third dot, based on a difference between a position of the first dot and a position of the second dot.

3. The method according to claim 1, wherein setting a state of the first dot includes setting a state of the first dot at a state of the second dot when a position of the first dot is closest to the position of the second dot.

4. A method of producing an image from a plurality of dots with non-constant intervals in distance, comprising generating image data for producing to form the image with the plurality of dots with non-constant intervals by calculating a state of plotting by each dot of the plurality of dots with non-constant intervals from original image data that forms an original image to be outputted with a plurality of dots with constant intervals in distance, wherein generating the image data for producing includes setting a state of a first dot included in the plurality of dots with non-constant intervals at a state of a second dot that is included in the plurality of dots with constant intervals obtained from the original image data and is at a position that is close to a position of the first dot.

5. The method according to claim 4, further includes producing the image by linearly scanning an image forming surface with light modulated by the image data for producing by a polygon mirror that rotates at a constant angular velocity.

6. The method according to claim 4, wherein setting a state of the first dot includes:

setting a state of the first dot at a state of the second dot and having a place in an order same as the first dot, and setting, when a difference between a position of the first dot and a position of the second dot is beyond a midpoint of a difference between a position of a third dot, which is included in the plurality of dots with the constant intervals and is adjacent to the second dot, and the position of the second dot, a state of the first dot at a state of the third dot.

7. The method according to claim 4, wherein setting a state of the first dot includes setting a state of the first dot at a state of the second dot when a position of the first dot is closest to a position of the second dot.

8. An image producing apparatus comprising:

an image producing unit for producing an image from a plurality of dots with varying intervals in distance by modulating the plurality of dots with varying intervals using image data for producing; and an image data generating unit for generating the image data for producing to form the image with the plurality of dots with varying intervals by obtaining a state to be plotted by each dot of the plurality of dots with varying intervals from original image data that forms an original image to be outputted with a plurality of dots with constant intervals in distance, wherein the image data generating unit includes setting a state of a first dot included in the plurality of dots with varying intervals at a state of a second dot that is included in the plurality of dots with constant intervals obtained from the original image data and is at a position that is close to a position of the first dot.

9. The image producing apparatus according to claim 8, wherein the image producing unit includes means for producing an image from the plurality of dots with varying intervals by linearly scanning an image forming surface with light modulated using the image data for producing by a polygon mirror that rotates at a constant angular velocity.

10. The image producing apparatus according to claim 8, wherein the image producing unit includes an optical system for exposing, on an image forming surface on a photoreceptor, a latent image from the plurality of dots with varying intervals that have been modulated using the image data for producing.

11. A print apparatus comprising:

an image producing apparatus according to claim 10;

a photoreceptor with an image forming surface;

a developing unit for developing a latent image formed on the photoreceptor using toner; and a transfer unit for transferring the developed image onto a print sheet.

12. An image producing apparatus comprising:

an image producing unit for producing an image from a plurality of dots with varying intervals in distance by modulating the plurality of dots with varying intervals using image data for producing; and an image data generating unit for generating the image data for producing to form the image with the plurality of dots with varying intervals by obtaining a state to be plotted by each dot of the plurality of dots with varying intervals from original image data that forms an original image to be outputted with a plurality of dots with constant intervals in distance, wherein the image data generating unit includes:

setting a state of a first dot included in the plurality of dots with varying intervals at a state of a second dot that is included in the plurality of dots with constant intervals obtained from the original image data and has a place in an order same as the first dot; and setting, when a difference between a position of the first dot and a position of the second dot is beyond a midpoint of a difference between a position of a third dot, which is included in the plurality of dots with the constant intervals and is adjacent to the second dot, and the position of the second dot, a state of the first dot at a state of the third dot.

13. A print apparatus comprising:
an image producing apparatus according to claim 12;
a photoreceptor with an image forming surface;
a developing unit for developing a latent image formed on the photoreceptor using toner; and
a transfer unit for transferring the developed image onto a print sheet.

14. An image producing apparatus comprising:
an image producing unit for producing an image from a plurality of dots with varying intervals in distance by modulating the plurality of dots with varying intervals using image data for producing; and
an image data generating unit for generating the image data for producing to form the image with the plurality of dots with varying intervals by obtaining a state to be plotted by each dot of the plurality of dots with varying intervals from original image data that forms an original image to be outputted with a plurality of dots with constant intervals in distance,
wherein the image data generating unit includes:
setting a state of a first dot included in the plurality of dots with varying intervals at a state of a second dot that is included in the plurality of dots with constant intervals obtained from the original image data when a position of the first dot is closest to the position of the second dot.

15. A print apparatus comprising:
an image producing apparatus according to claim 14;
a photoreceptor with an image forming surface;
a developing unit for developing a latent image formed on the photoreceptor using toner; and
a transfer unit for transferring the developed image onto a print sheet.

16. A program product for causing a computer to generate image data for producing, the image data for producing being to be transferred to an image producing apparatus that includes means for producing an image from a plurality of dots with varying intervals in distance by modulating the plurality of dots with varying intervals using the image data for producing,
wherein the program includes generating the image data for producing to form an image with the plurality of dots with varying intervals from original image data that forms a target image to be outputted by the image producing apparatus with a plurality of dots with constant intervals in distance by setting a state of a first dot included in the plurality of dots with varying intervals at a state of a second dot that is included in the plurality of dots with constant intervals obtained from the original image data and is at a position that is close to a position of the first dot.

* * * * *